Sept. 4, 1956  O. V. SAUNDERS  2,761,289
REFRIGERATING APPARATUS HAVING SHELF IN DOOR COMPARTMEMT
Filed Oct. 26, 1953  2 Sheets-Sheet 1
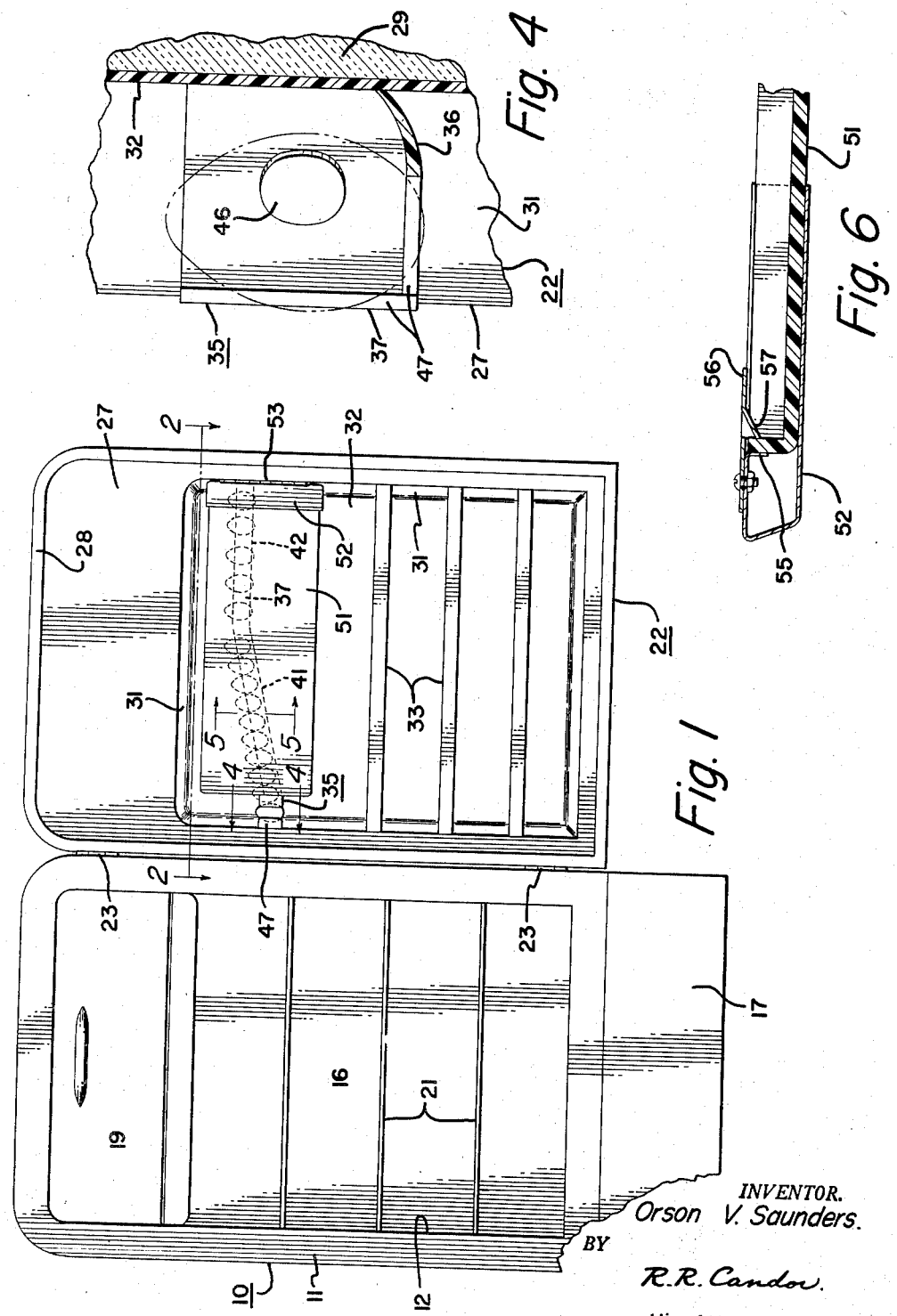
INVENTOR.
Orson V. Saunders.
BY
R. R. Candor
His Attorney.

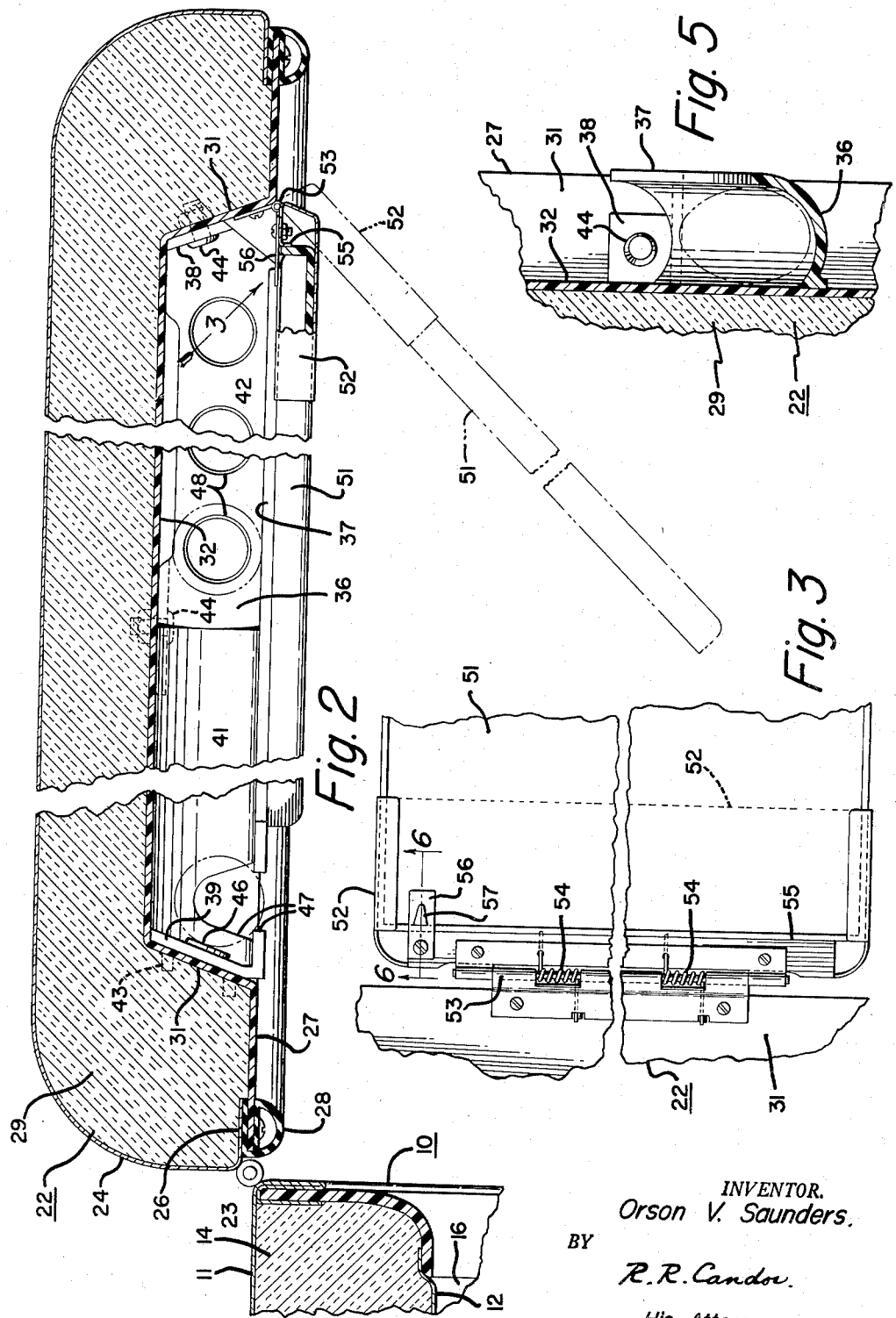

United States Patent Office 2,761,289
Patented Sept. 4, 1956

2,761,289

REFRIGERATING APPARATUS HAVING SHELF IN DOOR COMPARTMENT

Orson V. Saunders, Dayton, Ohio, assignor to General Motors Corporation, Detroit, Mich., a corporation of Delaware Application October 26, 1953, Serial No. 388,340

13 Claims. (Cl. 62—89)

This invention relates to refrigeration and particularly to the storage of eggs or the like in refrigerators.

I am aware of the fact that others have provided egg supporting trays or racks in the food storage compartment of a household refrigerator cabinet for cooling and preserving the same. Most of these trays or racks have not been entirely satisfactory for one reason or another. For instance egg racks have been mounted upon either a side wall of a refrigerated food storage compartment of a refrigerator cabinet, upon a food supporting shelf in the compartment or suspended from such a shelf. In these prior arrangements of egg supporting trays or racks it has been difficult to refill the same and they are not located to be readily accessible for removal of an egg or eggs therefrom because of interference thereto either by food products in the food storage compartment or by the shelves therein. Furthermore the dispensing end of prior inclined egg trays or racks associated with refrigerator cabinets have not been constructed to permit fingers of a housewife to firmly grasp and remove an egg therefrom and this has frequently resulted in dropping and breaking eggs during their removal.

An object of my invention is to provide an improved arrangement for the storage and preservation of eggs within the low temperature of a refrigerator cabinet and the complete segregation of the stored eggs from food products therein.

Another object of my invention is to provide an egg storage and dispensing chute on the door of a refrigerator cabinet which chute may be readily filled and is arranged to reduce to a minimum the hazard of breaking eggs both while being stored on the door and during the act of removing eggs from the cabinet.

It is another object of my invention to provide means cooperating with the inner face of a door, affording access to the interior of a food storage compartment of a refrigerator cabinet, whereby this means together with the face of the door form the bottom and opposed upright side walls of an inclined egg chute and to locate the lower dispensing end of the chute at the edge of the door which is hingedly secured to the cabinet.

A further object of my invention is to provide an inclined egg chute within a cavity or recess in the inner face of a refrigerator cabinet door and to conceal all but the lower dispensing end of the chute from view by a closure member which is pivotally mounted on and detachable from the door for facilitating filling of the chute and for permitting the same to be separated from the door and utilized as a serving tray for receiving articles from the refrigerator cabinet respectively.

In carrying out the foregoing objects it is a still further and more specific object of my invention to provide a cutaway slot or opening in a part of the bottom and across the upright front wall of the lower dispensing end portion of an inclined egg chute on the door of a refrigerator cabinet which allows the lowermost egg of a row of eggs in the chute to be firmly grasped such as by a finger and thumb of a person's hand and also permits the finger or thumb to be passed upwardly through the chute while removing the egg therefrom.

Further objects and advantages of the present invention will be apparent from the following description, reference being had to the accompanying drawings, wherein a preferred form of the present invention is clearly shown.

In the drawings:

Figure 1 is a front view of a refrigerator cabinet with the food storage compartment door thereof in open position to show my invention incorporated therein;

Figure 2 is an enlarged horizontal broken sectional view taken on the line 2—2 of Figure 1 showing an egg chute and a cover therefor mounted on the refrigerator cabinet door;

Figure 3 is an enlarged fragmentary view looking substantially in the direction of the arrow 3, which is disposed perpendicular to the dot-dash position of the chute cover in Figure 2 showing the pivotal mounting of a sleeve supporting element to the refrigerator cabinet door;

Figure 4 is an enlarged fragmentary sectional view taken on the line 4—4 of Figure 1 showing a cutaway portion at the lower dispensing end of the egg chute;

Figure 5 is an enlarged fragmentary sectional view taken on the line 5—5 of Figure 1 showing a portion of the inclined egg chute; and Figure 6 is an enlarged fragmentary sectional view taken on the line 6—6 of Figure 3.

Referring to the drawings, for illustrating my invention, I show in Figure 1 thereof a household refrigerator cabinet, generally represented by the reference character 10, including the usual outer shells or panels 11 and an inner metal liner 12. Liner 12 is spaced from the outer cabinet shells or panels 11 and any suitable insulating material 14 (see Figure 2) is disposed in this space as is conventional in the art. The liner 12 forms the top, bottom, back and side walls of a food storage compartment 16 within cabinet 10. A machine compartment, closed by the front closure member 17, is provided in cabinet 10 below compartment 16 as is also conventional in the art. This machine compartment is utilized to house a refrigerant translating device of a closed refrigerating system associated with the refrigerator cabinet and which may comprise a motor-compressor-condenser unit. The refrigerating system also comprises or includes a refrigerant evaporator, suitably connected by conduits or pipes with the unit in the machine compartment, located within the upper portion of compartment 16 for cooling and causing circulation of air therein which consequently cools food products stored in this compartment. This evaporator may be of any suitable or desirable construction and is preferably of the sheet metal type shaped to provide walls of an open front freezing or frozen food storage chamber within the food compartment 16. The open front of the freezing chamber formed by the evaporator is closed by a suitable closure member 19 hingedly mounted to the evaporator or to opposed upright side walls of compartment 16. Compartment 16 has a plurality of the usual superimposed and horizontally disposed perforated or reticulated food supporting shelves 21 mounted therein. Food storage compartment 16 presents a front opening in cabinet 10 providing access to the interior of this compartment. The access opening of compartment 16 is normally closed by a recessed insulated door structure, generally represented by the reference character 22, to be more fully described hereinafter. Door 22 is hingedly mounted upon cabinet 10 for horizontal swinging movement relative thereto by a plurality of hinges 23 (see Figures 1 and 2).

In the present disclosure the door 22, which normally closes the front access opening of food storage compartment 16, comprises an outer substantially rigid metal pan or panel 24 flanged inwardly about the periphery thereof as at 26 (see Figure 2). An inner door pan or panel 27 has its peripheral edge portions located in overlapping relation with and secured to the peripheral flange 26 on outer door panel 24 by screws or the like. Inner door panel 27 is preferably formed of a suitable molded plastic material. A rubber or the like gasket 28 has a portion interposed between the peripheral edges of door panels 24 and 27 and is held in place on door 22 by the screws which secure these panels to one another. Gasket 28 is provided with an integral resilient bead projecting outwardly therefrom and adapted to engage the front wall of cabinet 10 to seal the food compartment 16 as is also conventional in the art. Insulating material 29 (see Figure 2) is disposed in the space between the inner and outer pans or panels 24 and 27 of door structure 22. The inner door panel 27 is dished or projected rearwardly as at 31 to provide the back wall 32 of a cavity or recess in the inner face of door 22. A plurality of vertically spaced apart shelves 33 are mounted, in any suitable or conventional manner, on door 22 and are disposed within the lower part of the recess therein in front of the wall 32 of this recess.

In accordance with my invention I desire to associate an egg or the like supporting device with the refrigerator so as to segregate the eggs from other food products within cabinet 10 and to render them readily accessible without interference by the shelves 21 and/or foods supported thereon and yet expose the eggs to the cool air in food compartment 16 for chilling and preserving them. Thus in the present disclosure I utilize the upper part of the recess in the inner face of door 22, above the shelves 33, for the location of one or more of such egg supporting devices. Referring now again to Figure 1 of the drawings it will be noted that I provide means cooperating with the inner face of door 22 which together with wall 32 of the recess therein forms an egg supporting device including a straight horizontal portion and an inclined chute portion. This device comprises a substantially L-shaped in cross sectional contour ledge member, generally represented by the reference character 35, preferably formed to molded plastic material. Obviously member 35 could be formed of wire rods or the like if desired bent and secured together in any suitable manner. Member 35 includes a bottom wall or rail 36, an upright front wall or rail 37 and upturned end walls 38 and 39 (see Figure 2). Member 35 is formed to provide an inclined chute portion 41 and a horizontal portion 42 (see Figure 1). The bottom wall 36 of horizontal portion 42 is flat while at least the top surface of the bottom wall 36 of chute portion 41 of member 35 is preferably curved. The end wall 39 of member 35 has one or more integral peg-like projections 43 extended through suitable holes provided in the dished part 31 of panel 27 to support the lower end of member 35 within the recess of door 22. The end wall 38 of member 35 and a downturned centrally located boss formed on member 35 each have a substantially flat headed bolt 44 passed through suitable openings therein and through suitable openings provided in the wall 32 respectively of inner door panel 27 to firmly secure the member 35 in place within the recessed portion of door 22. End wall 39 of member 35 is provided with a counterbored portion in which a piece of sponge or foam rubber or the like is located to provide a cushioning bumper 46 for a purpose to be hereinafter described. Bumper 46 may be glued or cemented in place upon member 35. It is to be appreciated that in mounting a chute-like egg supporting device on a door of a refrigerator cabinet provision must be made to retain the eggs in the chute and particularly the lowermost egg in the chute located at the dispensing end thereof throughout swinging movement of the door and specifically during the act of opening and slamming the door closed. While such provision is necessary it is also essential to provide means whereby the lowermost egg of a row of eggs at the dispensing end of the chute can be firmly grasped and readily removed from the chute. For this reason the lower end of chute 41, adjacent its end wall 39, is provided with a cutaway part or open portion which forms an opening, indicated at 47, extending forwardly from a central point in the bottom wall or rail 36 and upwardly entirely across the front wall or rail 37 of member 35. A plurality of spaced apart holes 48 are provided in the bottom wall 36 of the horizontal portion 42 of member 35. Opening or open portion 47 and holes 48 provided in the horizontal portion 42 of member 35 are for a purpose to be presently described. While the egg dispensing end of chute 41 can, optionally, be located at either side edge of door 22 it will be noted that I, preferably for a certain reason, locate the lower end of chute 41 of member 35 adjacent the edge of door 22 which is pivotally mounted, by the hinges 23, to cabinet 10. It will also be noted that portions of the bottom wall 36 of member 35 are spaced from the rear wall 32 of the recess in door 22 to permit the circulation of cool air in the food compartment 16 of cabinet 10 to circulate around the back of this member 35 while door 22 is closed.

A cover member 51, preferably in the form of a substantially flat molded plastic pan or tray, covers and conceals all of member 35 except the lower end of chute 41 having the cutaway opening 47 therein. This cover member 51 is detachably mounted in a socket provided in a sleeve-like element 52 pivotally secured to door 22, by a suitable hinge 53, for horizontal swinging movement relative thereto when door 22 is opened. Coil springs 54 (see Figure 3) associated with sleeve element 52 and hinge 53 normally bias element 52 and consequently cover or concealing member 51 therein into parallel relation with the inner face of door 22 as shown by the full line position thereof in Figure 2. Cover member 51 is swingable with sleeve element 52 about hinge 53 to uncover the member 35 as shown by the dot-dash lines in Figure 2. This renders the chute device readily accessible for inspection and refilling. Cover member 51 is also detachable from sleeve element 53 and consequently door 22 so that it can be removed from the refrigerator cabinet 10 and utilized as a serving tray for transmitting food products from the refrigerator to the dinner table. This cover member is normally locked within sleeve element 52 with its top and bottom edges adjacent two corners thereof bearing against the upper and lower walls respectively of the sleeve element (see Figure 3). The flanged end of tray or cover member 51 is normally abutted against an inturned portion or portions 55 on sleeve element 52 (see Figure 6). A leaf spring 56 suitably secured to the inner part of sleeve element 52, adjacent the inturned portion 55 thereof such as by a screw, has a projecting catch portion 57 formed thereon and this catch 57 engages a flanged edge at either end of cover member 51 to prevent its accidental removal from door 22. When it is desired to detach cover member 51 from sleeve element 52 for removal from door 22 the spring 56 is manually moved or bowed to release the catch portion 57 thereof from engagement with the flanged end of cover 51 and thereafter cover member 51 may be slid out of the sleeve element 52.

In the use of the refrigerator herein described cabinet door 22 is opened and thereafter cover member 51 may be swung open. Eggs, indicated by the dot-dash lines in the various figures of the drawings, to be stored over a considerable period of time are then placed in a supported position over the holes 48 provided in the horizontal portion 42 of the egg rack device 35. A row of eggs, indicated by the dot-dash lines in the drawings (see Figure 1), are also placed in the chute portion 41 of device 35 and supported on the bottom wall 36 thereof in an upright position and in contacting or abutting side by side relationship. The first egg placed in chute 41 strikes the resilient bumper 46 to cushion its movement into the lower end of the chute 41. This lowermost egg is caught by edges of the cut out portion or opening 47 and is retained in the lower dispensing end of chute 41 until it is desired to be removed. After the desired number of eggs have been placed in or upon the device 35 cover member 51 is released and the coil springs 54 will move the same into the position shown in Figures 1 and 2 to conceal all but the one egg in the dispensing lower end of chute 41. Cover member 51 in addition to forming a concealing means for the eggs and a removable serving tray also serves another or further important purpose in the presently disclosed arrangement. This further purpose of cover member 51 is that of reminding the user of the refrigerator to remove the older or longer stored egg which is in the uncovered lower end of chute 41. As eggs are removed from chute 41 cover member 51 may be opened and eggs on the horizontal portion 42 of member 35 can be shifted therefrom directly into the uppermost part of inclined chute 41. This insures that the first purchased or longer stored eggs in the refrigerator will be removed and consumed prior to the more recently purchased stored fresher eggs.

While the cut out portion or opening 47 in the lower end of chute 41 of member 35 retains the lowermost egg of the row thereof within the chute it is also designed to facilitate the firm grasping of opposite sides of the eggs to be removed from the chute so as to reduce breakage of eggs to a minimum during their removal from a refrigerator and transmission thereof to another locality. For example the opening 47, by virtue of extending across a substantial part of the bottom wall 36 and continuously upward across the front wall 37 of the lower end of chute 41, permits, after a person's fingers have firmly grasped the top and bottom sides of an egg at opening 47, the fingers of a person's hand to pass through the lower end of chute 41 of member 35 during the act of removing an egg upwardly out of the chute. Removal of an egg from the lower end of chute 41 causes the next adjacent egg of the row thereof to slide or roll down against the bumper 46 and come to rest at retaining opening 47. Also by virtue of positioning the lower dispensing end of chute 41 of member 35 adjacent the side edge of door 22 which is hinged to the cabinet swinging movements of the door 22 minimizes the contacting pressure of the eggs of the row thereof in chute 41 against one another and eliminates breakage of eggs in the chute when door 22 is slammed shut. The eggs supported by member 35 are exposed to the low temperature within the food storage compartment 16 of the refrigerator cabinet 10, when door 22 is in closed position, and the space between cover member 51 and inner panel 27 of door 22 at the top and bottom of this member 51 permits cold air to circulate around the cover member to chill and preserve the eggs.

From the foregoing it should be understood that I have provided a novel and improved arrangement for storing eggs in association with the interior of the refrigerator. My egg supporting device is designed to facilitate the removal or harvesting of eggs therefrom to thereby reduce to a minimum the likelihood of breakage of eggs during such act. My improved arrangement completely segregates the stored eggs from other food products in the refrigerator cabinet and renders them accessible for removal without interference from foods within the cabinet and shelves or other elements therein. The concealing of all eggs in the supporting device of the present disclosure except the one at the lower dispensing end thereof serves as a reminder that an egg or eggs stored in the chute over the longest period of time should be first removed therefrom to thereby eliminate guess work on the part of the housewife as to which of the eggs are to be next removed for consumption.

While the form of embodiment of the invention as herein disclosed constitutes a preferred form, it is to be understood that other forms might be adopted, as may come within the scope of the claims which follow.

What is claimed is as follows:

1. In a refrigerator, a cabinet having a food storage compartment therein provided with an open front, a door hingedly mounted upon said cabinet for horizontal swinging movement relative thereto and normally closing the open front of said compartment, a refrigerating system associated with said cabinet including a refrigerant evaporator for cooling air in said compartment, means mounted upon said door and extending along the inner face thereof so as to normally be exposed to the cool air in said compartment, said means being disposed at an angle and forming at least the front and a bottom of an inclined chute for receiving and supporting a row of eggs in side by side abutting relationship, said chute being provided with an open portion adjacent its lower end, said open portion extending forwardly across a part of the bottom of said chute and upwardly entirely across the front thereof, the lowermost egg of the row of eggs in said chute being aligned with the open portion thereof and engaging portions of the chute adjacent thereto for normally retaining the lowermost egg in said chute, and said open portion of the chute permitting a person's fingers, after grasping said lowermost egg, to be passed upwardly through said chute to remove the egg from the lower end thereof.

2. In a refrigerator, a cabinet having a food storage compartment therein provided with an open front, a door hingedly mounted upon said cabinet for horizontal swinging movement relative thereto and normally closing the open front of said compartment, a refrigerating system associated with said cabinet including a refrigerant evaporator for cooling air in said compartment, means mounted upon said door extending along the inner face thereof forming an inclined chute for receiving and supporting a row of eggs in side by side abutting relationship normally exposed to the cool air in said food compartment, said chute having a lower egg dispensing end, a cover member on said door concealing all but the lower egg dispensing end of said chute, and said cover member being movable relative to said door.

3. In a refrigerator, a cabinet having a food storage compartment therein provided with an open front, a door hingedly mounted upon said cabinet for horizontal swinging movement relative thereto and normally closing the open front of said compartment, a refrigerating system associated with said cabinet including a refrigerant evaporator for cooling air in said compartment, means mounted upon said door extending along the inner face thereof forming an inclined chute for receiving and supporting a row of eggs in side by side abutting relationship normally exposed to the cool air in said food compartment, said chute having a lower egg dispensing end, a sleeve-like element hingedly mounted on said door, a cover member carried by said sleeve-like element, said cover member extending over said inclined chute and concealing all but the lower egg dispensing end thereof, and said cover member being detachable from said sleeve-like element to provide a serving tray for transmitting food products to and from said food compartment.

4. In a refrigerator, a cabinet having a food storage compartment therein provided with an open front, a door hingedly mounted upon said cabinet for horizontal swinging movement relative thereto and normally closing the open front of said compartment, a refrigerating system associated with said cabinet including a refrigerant evaporator for cooling air in said compartment, a substantially L-shaped member secured to said door and extending angularly along the inner face thereof, said member cooperating with the inner face of said door and together therewith forming upright front and back walls and a bottom wall of an inclined chute for receiving and supporting a row of eggs in side by side abutting relationship normally exposed to the cool air in said food compartment, said chute having an opening adjacent its lower end, said opening extending forwardly across a part of the bottom wall of said chute and continuously upward across the front wall thereof, and said opening in said chute permitting a person's fingers to pass upwardly through the chute upon grasping the lowermost egg of the row of eggs in the chute for removing the same therefrom.

5. The construction defined in claim 4 wherein a cover member carried by and movable relative to the food storage compartment door conceals all of the chute except the opening at the lower end thereof.

6. In a refrigerator, a cabinet having a food storage compartment therein provided with an open front, a door hingedly mounted upon said cabinet for horizontal swinging movement relative thereto and normally closing the open front of said compartment, a refrigerating system associated with said cabinet including a refrigerant evaporator for cooling air in said compartment, said door comprising a panel forming the inner face thereof, a portion of said panel being indented relative to other portions thereof to provide a recess in the inner face of said door, means forming an inclined chute within and extending along said recess for receiving and storing eggs in exposed relationship to the cool air in said food storage compartment, and the lower end of said chute being provided with an opening in the front thereof normally retaining an egg therein and permitting a person's fingers to grasp opposite sides of the egg during the act of removing the same upwardly out of said chute.

7. In a refrigerator, a cabinet having a food storage compartment therein provided with an open front, a door hingedly mounted upon said cabinet for horizontal swinging movement relative thereto and normally closing the open front of said compartment, a refrigerating system associated with said cabinet including a refrigerant evaporator for cooling air in said compartment, said door comprising a panel forming the inner face thereof, a portion of said panel being indented relative to other portions thereof to provide a recess in the inner face of said door, means forming an inclined chute within and extending along said recess for receiving and storing eggs in exposed relationship to the cool air in said food storage compartment, said chute having a lower egg dispensing end, a cover member concealing all but said lower dispensing end of said chute, means for hingedly mounting said cover member to said door for swinging movement relative thereto, and said cover member being removable from its hingedly mounting means for use as a serving tray for the reception of food products during the act of removing same from said food storage compartment.

8. In combination with a refrigerator cabinet having a food storage compartment therein presenting a forwardly facing access opening, a door hingedly mounted upon the cabinet for horizontal swinging movement for normally closing the compartment access opening and a refrigerating system associated with the cabinet including a refrigerant evaporator for cooling air within the food compartment; means extending along a portion of the inner face of said compartment door in exposed relationship to cool air in the compartment, said means being disposed at an angle with respect to the horizontal and forming at least front and bottom walls of a chute adapted to receive and support a row of eggs or the like in contacting side by side relationship, the lower end of said chute being provided with an opening extending forwardly from a part of said bottom wall and upward continuously across said front wall thereof, the width of said opening being less than the circumference of the lowermost egg in said chute to normally retain the same therein, and the opening in the lower end of said chute permitting a finger of a person's hand to be passed therethrough during the act of removing the lowermost egg of the row thereof in said chute upwardly out of the same.

9. In combination with a refrigerator cabinet having a food storage compartment therein presenting a forwardly facing access opening, a door hingedly mounted upon the cabinet for horizontal swinging movement for normally closing the compartment access opening and a refrigerating system associated with the cabinet including a refrigerant evaporator for cooling air within the food compartment; means extending along a portion of the inner face of said compartment door in exposed relationship to cool air in the compartment, said means being disposed at an angle with respect to the horizontal and forming walls of a chute adapted to receive and support a row of eggs or the like in contacting side by side relationship, the lower end of said chute being provided with a cut out portion normally retaining the lowermost egg of the row thereof in said chute and being of sufficient size to permit the passage of a finger of a person's hand therethrough during the act of removing an egg upwardly out of the chute, a cover member concealing all but said lower end of the chute, and said cover member being movable relative to said food compartment door.

10. In combination with a refrigerator cabinet having a food storage compartment therein presenting a forwardly facing access opening, a door hingedly mounted upon the cabinet for horizontal swinging movement for normally closing the compartment access opening and a refrigerating system associated with the cabinet including a refrigerant evaporator for cooling air within the food compartment; means extending along a portion of the inner face of said compartment door in exposed relationship to cool air in the compartment, said means being disposed at an angle with respect to the horizontal and forming walls of a chute adapted to receive and support a row of eggs or the like in contacting side by side relationship, the lower end of said chute being located adjacent the edge of said compartment door hinged to said cabinet, and said lower end of the chute being provided with a cut out portion normally retaining the lowermost egg of the row thereof in said chute and of such size as to permit the passage of a finger of a person's hand therethrough during the act of removing the lowermost egg upwardly out of the chute.

11. In combination with a refrigerator cabinet having a food storage compartment therein presenting a forwardly facing access opening, a door hingedly mounted upon the cabinet for horizontal swinging movement for normally closing the compartment access opening and a refrigerating system associated with the cabinet including a refrigerant evaporator for cooling air within the food compartment; means extending along a portion of the inner face of said compartment door in exposed relationship to cool air in the compartment, said means being disposed at an angle with respect to the horizontal and forming walls of a chute adapted to receive and support a row of eggs or the like in contacting side by side relationship, the lower end of said chute being provided with a resilient bumper for cushioning sliding movement of an egg thereinto, and said chute being provided with a cut out portion adjacent its said lower end for permitting a finger of a person's hand to pass therethrough during the act of removing an egg upwardly thereof out of said chute.

12. In a refrigerator, a cabinet having a food storage compartment therein provided with an open front, a door hingedly mounted upon said cabinet for horizontal swinging movement relative thereto and normally closing the open front of said compartment, a refrigerating system associated with said cabinet including a refrigerant evaporator for cooling air in said compartment, said door comprising a panel forming the inner face thereof, a portion of said panel being indented relative to other portions thereof to provide a recess in the inner face of said door, means secured to said door within and extending across said recess for receiving and storing eggs in exposed relationship to the cool air in said food storage compartment, said means including an upper horizontal portion and a portion extending downwardly therefrom and forming an inclined chute, said horizontal portion of said means having openings therein for receiving eggs and holding them stationary with respect to said door, said inclined chute forming portion of said means receiving a row of eggs in side by side contacting relationship, and the lower end of said chute being provided with a cutaway portion normally retaining the lowermost egg of the row thereof in said chute and permitting a person's fingers to grasp the lowermost egg and pass upwardly through the chute during the act of removing the same therefrom.

13. In a refrigerator, a cabinet having a food storage compartment therein provided with an open front, door hingedly mounted upon said cabinet for horizontal swinging movement relative thereto and normally closing the open front of said compartment, a refrigerating system associated with said cabinet including a refrigerant evaporator for cooling air in said compartment, said door comprising a panel forming the inner face thereof, a portion of said panel being indented relative to other portions thereof to provide a recess in the inner face of said door, means secured to said door within and extending across said recess for receiving and storing eggs in exposed relationship to the cool air in said food storage compartment, said means including an upper horizontal portion and a portion extending downwardly therefrom and forming an inclined chute, said chute having an egg dispensing lower end, and a cover member movable relative to said door concealing all of said means except said lower dispensing end of said chute.

References Cited in the file of this patent
UNITED STATES PATENTS

| | | |
|---|---|---|
| 2,061,453 | Crosley | Nov. 17, 1936 |
| 2,188,044 | Hickman | Jan. 13, 1940 |
| 2,322,769 | Norberg | June 29, 1943 |
| 2,565,995 | Spencer | Aug. 28, 1951 |
| 2,579,848 | Nave | Dec. 25, 1951 |
| 2,649,697 | Sandin | Aug. 25, 1953 |
| 2,667,758 | Tenney | Feb. 2, 1954 |